United States Patent
Nakanishi et al.

(10) Patent No.: US 6,638,442 B1
(45) Date of Patent: Oct. 28, 2003

(54) POLYCRYSTALLINE FERROMAGNETIC METAL OXIDE AND METHOD OF MANUFACTURING THE SAME

(75) Inventors: Kenji Nakanishi, Chiba (JP); Yasushi Ogimoto, Noda (JP); Nobuo Tsuchimine, Hiki-gun (JP)

(73) Assignees: Sharp Kabushiki Kaisha, Osaka (JP); Toshima MFG Co., Ltd, Saitama (JP)

( * ) Notice: Subject to any disclaimer, the term of this patent is extended or adjusted under 35 U.S.C. 154(b) by 0 days.

(21) Appl. No.: 09/663,215

(22) Filed: Sep. 15, 2000

(30) Foreign Application Priority Data

Sep. 17, 1999 (JP) ............................. 11-264363

(51) Int. Cl.$^7$ ............................. H01F 1/10; C01F 11/00; C01G 44/00; C01G 45/00
(52) U.S. Cl. ............................. 252/62.51 R; 252/62.63; 423/594
(58) Field of Search .......................... 423/594; 501/123, 501/126; 252/62.63, 62.56, 62.51 R, 62.57, 62.58, 62.59, 62.6, 62.61, 62.62, 62.65, 62.51 C

(56) References Cited

U.S. PATENT DOCUMENTS

| | | | | |
|---|---|---|---|---|
| 3,884,823 A | * | 5/1975 | Clendenen et al. | 252/62.63 |
| 4,062,922 A | * | 12/1977 | Olson et al. | 252/62.62 |
| 4,713,877 A | * | 12/1987 | Abbott et al. | 252/62.63 |
| 5,302,306 A | * | 4/1994 | Nagata et al. | 252/62.62 |
| 6,137,395 A | * | 10/2000 | Kobayashi et al. | 338/32 R |

OTHER PUBLICATIONS

Kim et al, "Large Room–Temperature Intergrain Magnetoresistance in Double Perovskite SrFe1–x(Mo or Re)xO3", Appl. Phys. Lett. vol. 74, No. 12, 3/99.*

T. H. Kim, et al. Appl. Phys. Lett., vol. 74, No. 12, 1999, "Large Room–Temperature Intergrain Magnetoresistance in double perovskite $SrFe_{1-x}(Mo$ or $Re)_xO_3$", pp. 1737–1739.

K–I. Kobayashi, et al. Nature, vol. 395, 1998, "Room–Temperature Magnetoresistance in an Oxide material with an Ordered Double–Perovskite Structure", pp. 677–680.

Y. Tomioka, et al. American Physical Society, Phys. Rev. B., vol. 61, No. 1, Jan. 1, 2000, "Magnetic and Electronic Properties of a Single Crystal of ordered Double Perovskite $Sr_2FeMoO_6$", pp. 422,427.

* cited by examiner

Primary Examiner—C. Melissa Koslow
(74) Attorney, Agent, or Firm—David G. Conlin; John B. Alexander; Edwards & Angell, LLP

(57) ABSTRACT

A polycrystalline ferromagnetic metal oxide has a density of 97% or more to less than 100%; and a method of manufacturing a polycrystalline ferromagnetic metal comprises a step of treating a polycrystalline ferromagnetic metal oxide under a high pressure reducing gas for high densification.

12 Claims, 6 Drawing Sheets

POLYCRYSTALLINE FERROMAGNETIC METAL OXIDE AND METHOD OF MANUFACTURING THE SAME

CROSS-REFERENCE TO RELATED APPLICATION

This application is related to Japanese application No. HEI 11(1999)-264363 filed on Sep. 17, 1999, whose priority is claimed under 35 USC §119, the disclosure of which is incorporated by reference in its entirety.

BACKGROUND OF THE INVENTION

1. Field of the Invention

The present invention relates to a polycrystalline ferromagnetic metal oxide and a method of manufacturing the same. More particularly, it relates to a polycrystalline ferromagnetic metal oxide with an ordered perovskite structure having high density and low resistance, and a method of manufacturing the same.

2. Description of Related Art

Recently, magnetic heads having a recording density of 40 Gbit/inch$^2$ has been targeted. For this purpose, considerable research has been done on materials or multi-layer films with effect such as GMR (giant magnetoresistance) and TMR (tunnel magnetoresistance) utilizing tunneling junction at ferromagnetic thin films sandwiching an extra-thin insulating layer.

However, the GMR materials exhibit magnetoresistance (MR) of less than 10%. Therefore further breakthrough is required for higher density.

In contrast, the TMR multilayer metal films utilizing an insulating layer of $Al_2O_3$ and the like exhibit MR of more than 10%, but advanced techniques with great precision are required for forming the multilayer film. For the purpose of higher recording density, it is expected that the magnetic head approaches or contacts a medium and is utilized under high temperature. Accordingly, characteristics of the TMR materials may possibly be deteriorated by element diffusion or the like, since the multilayer formation has been controlled at low temperature.

It is known that CMR (colossal magnetoresistance) materials exhibit full spin polarization at absolute zero, and thus they are expected to show high MR of almost 100%. Oxides thereof are not influenced by temperature and air, and deterioration of the characteristics due to the element diffusion is less serious in the temperature range of several hundred °C. because of stability to temperature and air of the materials. However, none of them can give favorable characteristics at room temperature so far.

For an oxide of ordered perovskite structure $Sr_2FeMoO_6$, magnetoresistance has recently been observed at room temperature. This material has a high Curie temperature and thus expected to exhibit spin polarization of about 70% at the maximum even at room temperature. MR calculated from the spin polarization value is almost 100%, therefore the material is considered as a magnetic head material for future generation.

Kim et al. describe about electrical and magnetic characteristics of the grain boundaries of the material (Applied Physics Letters Vol. 74, No. 12, p1737–1739(1999)). Whether the grain boundaries are coupled ferromagnetically or antiferromagnetically depends on the material of ferromagnetic grains constituting the grain boundaries, even though the ferromagnetic grain boundaries are insulative. Ordered perovskite materials such as $Sr_2FeMoO_6$ belong to the former and manganese perovskite materials belong to the latter. The magnitude of the magnetoresistance highly depends on the temperature. Therefore as the temperature increases, the magnetoresistance of the former materials abruptly decreases, whereas that of the latter materials gradually decreases. In the ordered perovskite materials such as $Sr_2FeMoO_6$, this is advantageously applied to obtain great magnetoresistance at room temperature.

The TMR materials have been suffering from large resistance, and thus a material with a hybrid structure of a layered one and a granular one has been proposed. The ordered perovskite oxide $Sr_2FeMoO_6$ exhibits the resistivity of about 1 mΩ·cm or less at room temperature in the form of single crystal or single crystalline thin film, but the resistivity increases to 28.5 mΩ·cm in the form of a polycrystalline bulk. In addition, the thin film formation requires highly advanced techniques to grow atomic layers one by one to form the film, which increases the production costs.

SUMMARY OF THE INVENTION

The inventors of the present invention have noticed that the ordered perovskite structure comprises a three-dimensional network of a $FeO_6$ octahedron and a $MoO_6$ octahedron which contributes to the conductivity, and thus the electronic conductivity is highly three-dimensional. Further, since the carrier density is as high as $10^{22}$ atm/cm$^3$, they have reached the conclusion that the ratio of carrier trap to the carrier can be suppressed, which can be effective by achieving by avoiding the generation of an insulating phase to be a tunnel barrier.

Then, intensive research has been conducted to densely couple the crystal grains in an atomic order. As a result, atomic interfaces of not less than 97% density without any heterogeneous phase in TEM level can be obtained with the aid of high-pressure treatment process, and then a polycrystalline substance having resistivity as low as 1 mΩ·cm or less can be produced. Thus, the present invention has been achieved.

According to the present invention, provided is a polycrystalline ferromagnetic metal oxide having a density in the range of 97% to 100%.

Still according to the present invention, provided is a method of manufacturing a polycrystalline ferromagnetic metal oxide by means of a treatment for high densification of a polycrystalline ferromagnetic metal oxide under high-pressure reducing gas.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
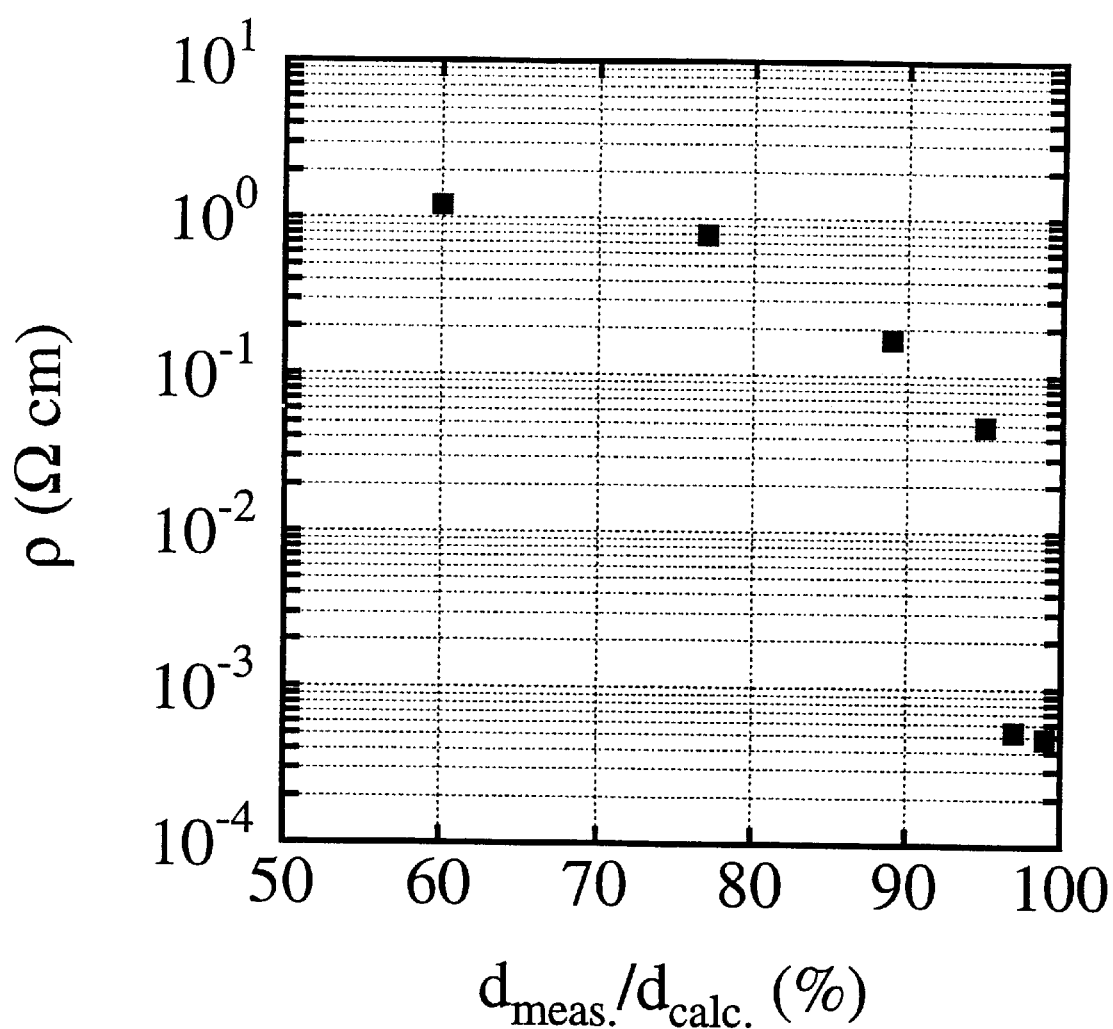
FIG. 1 is a graph illustrating a relationship between density ($d_{meas.}/d_{calc.}$, $d_{meas.}$:measured density, $d_{calc.}$:calculated density) and resistivity (ρ) of $Sr_2FeMoO_6$ which is a polycrystalline ferromagnetic metal oxide of the present invention.

The polycrystalline ferromagnetic metal oxide of the present invention has a density of 97% or more to less than 100%. Here, the density in this context signifies a value calculated by $$\frac{d_{meas.}(\text{measured density})}{d_{calc.}(\text{measured density})} \times 100.$$

Here, the $d_{meas.}$ (measured density) is a value obtained by divining the mass [M] by the volume [V] (the width, length and height of, for example, a rectangular parallelepiped sample are measured by a micrometer or a graduated microscope to obtain the volume [V] of the sample, the mass [M] thereof is measured by an electric balance.) The $d_{calc.}$ (calculated density) is calculated as follows. To calculate the density of $Sr_2FeMoO_6$, for example, the mass [M] of each element is added to obtain the total mass of the chemical formula. The obtained total mass corresponds to the mass of 1 mol. Therefore the obtained value is divided by Avogadro's constant $6.02 \times 10^{23}$. A unit cell contains 2 chemical formulae so that the divided value is multiplied by 2 to obtain the mass of the unit cell. By the X-ray diffraction, a-axis and c-axis of the unit cell have been obtained therefore the volume [V] is represented by a×a×c. The density is obtained by divining the mass [M] by the volume [V]

To realize the density, a treatment for high densification of a polycrystalline ferromagnetic metal oxide under high pressure reducing gas is effective.

Materials of the polycrystalline ferromagnetic metal oxide of the present invention are not particularly limited. For example, a material comprising strontium, iron, molybdenum and oxygen may be used. More specifically, it may be $Sr_2FeMoO_6$ and the like.

The polycrystalline ferromagnetic metal oxide of the present invention comprises a semimetal of high spin polarization. In general, electrons have up spin or down spin, and the two kinds of the electron spins are contained in almost the same amount in general substances. Ferromagnetic material of higher spin polarization can be obtained by incorporating one of the two spins in a greater amount than the other. Incidentally, the spin polarization of iron, which has been known as a ferromagnetic metal, is about 40%. However, the polycrystalline ferromagnetic metal oxide of the present invention is theoretically considered to have the full spin polarization only with the up spin at low temperature, and this is considered as a cause of drastic increase in MR. Then, the inventors has realized to decrease the resistivity equivalent to that of single crystals by making a polycrystalline ferromagnetic metal oxide of high density comprising a semimetal having the high spin polarization (having an intermediate amount of carriers as compared with those of metals and semiconductors and showing intermediate electrical characteristics)

In the polycrystalline ferromagnetic metal oxide of the present invention, grain boundaries among the crystal grains that constitute the polycrystalline material do not have insulating properties of the carriers conduction barrier. Further, the polycrystalline ferromagnetic metal oxide is of an ordered perovskite crystal structure comprising an electro-conductive metal-oxygen octahedron. Polycrystalline ferromagnetic metal oxides of the present invention may also possess a small electrical conductivity anisotropy.

The crystal grains that constitute the polycrystalline ferromagnetic metal oxide of the present invention have the grain boundaries coupled in an atomic level and exhibit resistivity of 1 mΩ cm or less, or more preferably exhibit a resistivity of 0.3 to 0.4 mΩ cm. The polycrystalline ferromagnetic metal oxides of the present invention may also have a magnetoresistance of 2% or more.

According to the method of manufacturing the polycrystalline ferromagnetic metal oxide of the present invention, a high pressure treatment, more specifically, a treatment for high densification under high pressure reducing gas is performed. The treatment for high densification may be performed, for example, under pressure of about 300 to about 600 kg/cm² in an atmosphere of inert gas, e.g., Ar, containing about 1 to about 5% of hydrogen gas at a temperature of about 1200 to about 1300° C. for about 1 to about 10 hours.

Hereinafter, the polycrystalline ferromagnetic metal oxide of the present invention and the method of manufacturing the same will be described in detail with reference to the drawings.

In the present example, six samples are prepared and density and resistivity of each sample are measured as described above. The measurement results of density: resistivity are 60%:1.2 Ω·cm, 77%:0.78 Ω·cm, 89%:0.168 Ω·cm, 95%:0.048 Ω·cm, 97%:0.00053 Ω·cm and 99%:0.00048 Ω·cm, respectivery. Those characteristics depending on the difference in density of prepared samples ($Sr_2FeMoO_6$) are shown in FIG. 1. FIG. 1 illustrates variation in resistivity depending on the difference in density after leaving the samples prepared by the undermentioned manufacturing method in air for one day.

When the density of the polycrystalline ferromagnetic metal oxide was about 90 to 95%, the resistivity was several tens of mΩ·cm, but when the density exceeded 97% it drastically decreased by two digits to 0.5 mΩ·cm at the maximum, which is almost equivalent to that of a single crystal. Further, resistivity to deterioration was also improved dramatically and almost no deterioration with time was observed except on the uppermost surface.

Next, the method of preparing the samples in this example will be mentioned.

Starting materials of $SrCO_3$, $CaCO_3$, $Fe_2O_3$, $MoO_3$ and $ReO_3$ were dried at 150° C. for dehydration to measure in an accurate composition ratio. These materials were mixed in a mortar, put in an alumina crucible and preliminarily calcined in air at 800° C. for 7 hours. Then, the mixed materials were calcined in Ar atmosphere containing 1 to 5% of hydrogen gas under pressure of 300 to 600 kg/cm² at 1200 to 1300° C. for 3 hours. According to this synthesis under high pressure gas, the concentration of hydrogen, which may possibly cause an explosion by reacting with oxygen in the air, can be reduced and the samples of high quality can be prepared in as a short period as 3 hours.

Powdery samples obtained by grinding the thus prepared bulk material were subjected to X-ray diffraction using CuKα ray of 40 kV and 100 mA for identification, confirmation of the existence of an impurity phase and determination of lattice constant. Based on these data, precise lattice constant and crystal structure were obtained by Rietveld method. Further, the electrical characteristics were determined by 4-terminal method (crystal shape of the bulk material: 14×10×1 (~14×3×1 mm$^3$, distance between the terminals: 3 mm, current between the terminals: 20 mA (max. 20 mA)) at room temperature. The magnetic characteristics were obtained by measuring M-H loop up to 20 kOe at room temperature using a vibrating sample megnetometer (VSM) and measuring temperature dependency of magnetization (Curie temperature measurement) under application of a magnetic field of 2.5 kOe at a temperature ranging from room temperature to 300° C. Powdery sample having a particle diameter of about 10 μm contained in a copper capsule was used under nitrogen or helium gas atmosphere for the measurement. The sample showed the magnetization of about 1 to 5 emu with a weight of about 0.1 g.

Figure 2:
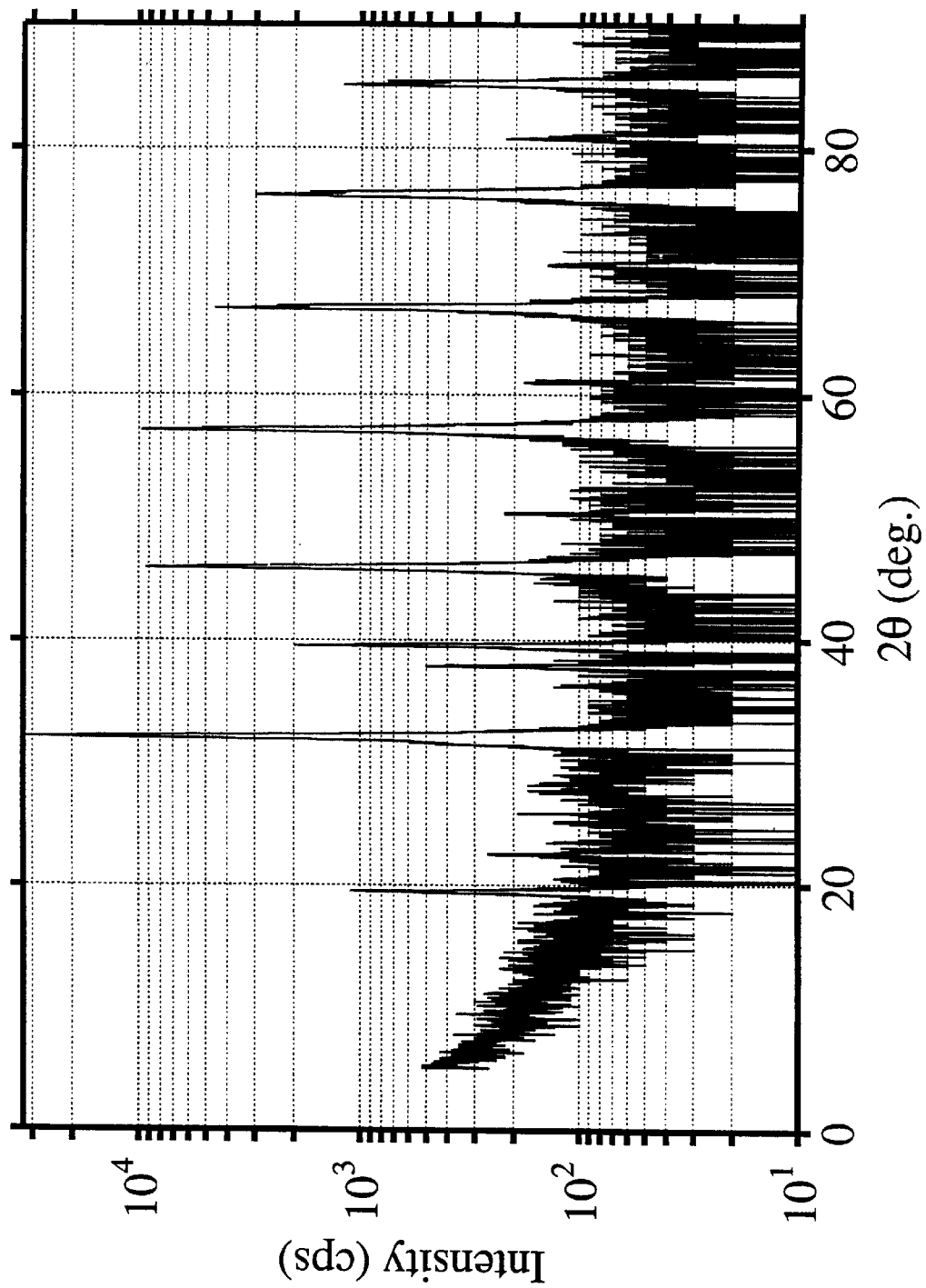
FIG. 2 is a graph illustrating an X-ray diffraction profile of $Sr_2FeMoO_6$ which is the polycrystalline ferromagnetic metal oxide of the present invention.

FIG. 2 shows the X-ray diffraction profile of $Sr_2FeMoO_6$. The X-ray diffraction profile was observed with great intensity and small half-width without an impurity peak of $SrMoO_4$ which appears at around 2θ=28° when a reducing atmosphere is insufficient. When the degree is high, a favorable crystallinity is shown in which $K\alpha_1$ and $\alpha_2$ of the X-ray are clearly separated. The clear separation of $K\alpha_1$ and $\alpha_2$ indicates that the half-width of each of the peaks of $K\alpha_1$ and $\alpha_2$ is small, that is, inhomogeneity in the composition of the bulk is small.

Further, a peak appeared at around 2θ=20° significantly reflects an ordered state of Fe and Mo (the order is 0% when Fe and Mo are distributed at random and 100% when Fe and Mo fully occupy B' site and B" site, respectively). That is, the greater the peak is, the better the order is. Regarding the maximum peak at around 2θ=33° as 100, the peak at around 2θ=20° is more than 4. Accordingly it is understood that the samples were highly ordered materials. For quantitative examination of the state of the order, the crystal structure was analyzed by Rietveld method. As a result, the degree of the order of Fe and Mo was as high as 91%.

Figure 3:
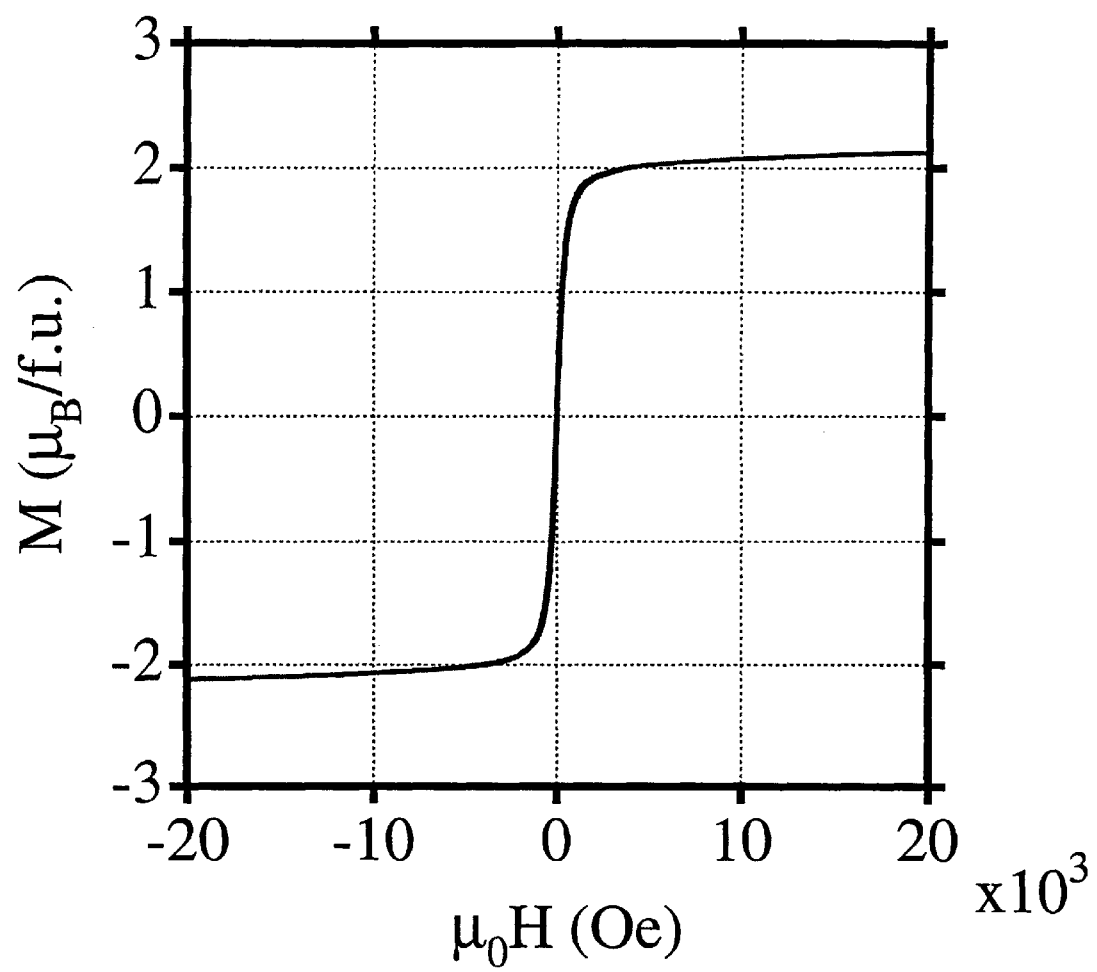
FIG. 3 is a graph illustrating a magnetization curve (magnetization:M vs. magnetic field: $\mu_B H$) of $Sr_2FeMoO_6$ which is the polycrystalline ferromagnetic metal oxide of the present invention.

FIG. 3 shows a magnetization curve of $Sr_2FeMoO_6$ per formula unit at room temperature under an applied magnetic field of −20×10$^3$ Oe to +20×10$^3$ Oe. The magnetization was not saturated at +20 kOe, but reached 2.13 $\mu_B$ (Bohr magneton) even at room temperature. This value is in the maximum class of the prevailed ones. Accordingly, the polycrystalline ferromagnetic metal oxide of the present invention is much favorable.

Figure 4:
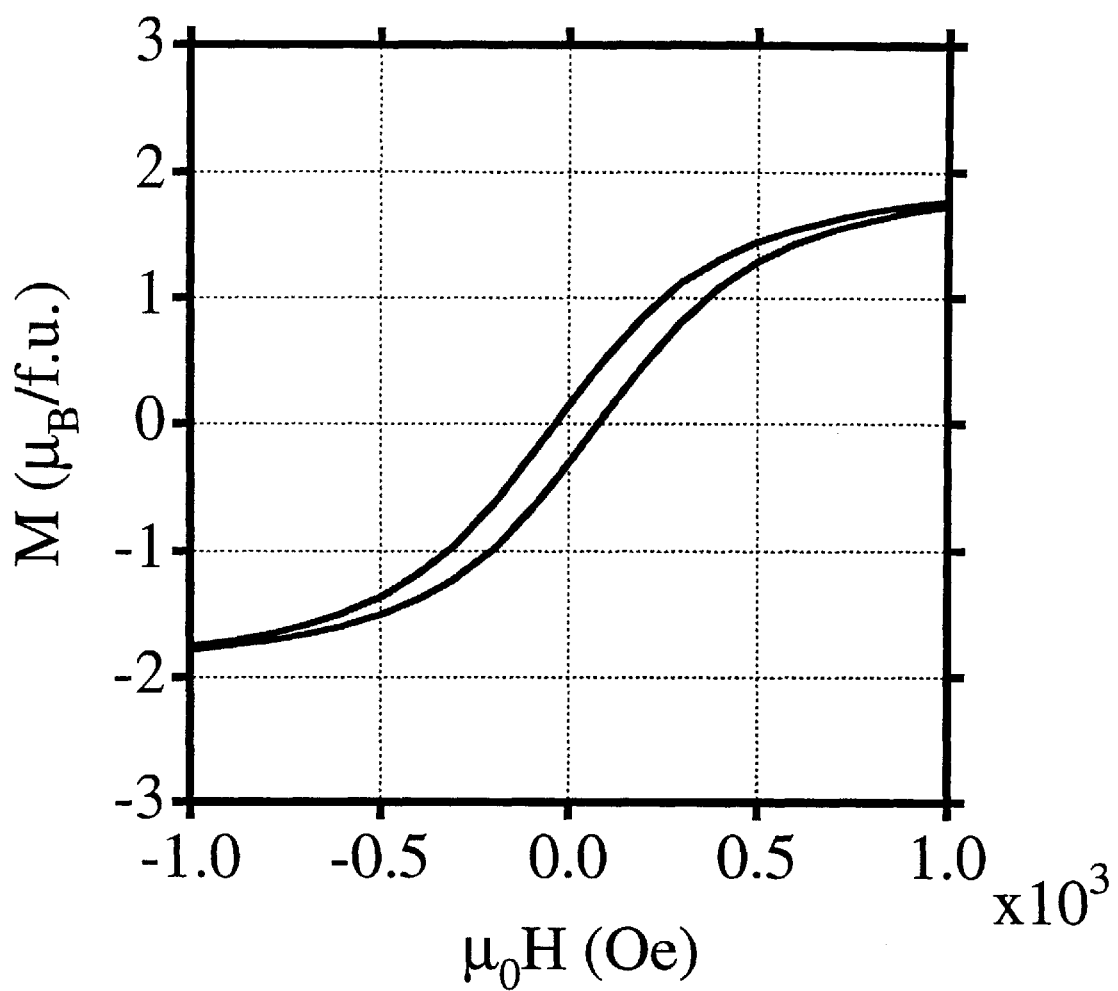
FIG. 4 is a graph illustrating a part of the magnetization curve shown in FIG. 3 enlarged in the horizontal axis.

In contrast, the magnetization shown in FIG. 4 shows a small coercive force and a steep increase when the magnetic field is low. It indicates that a favorable soft ferromagnetic substance is obtained.

Figure 5:
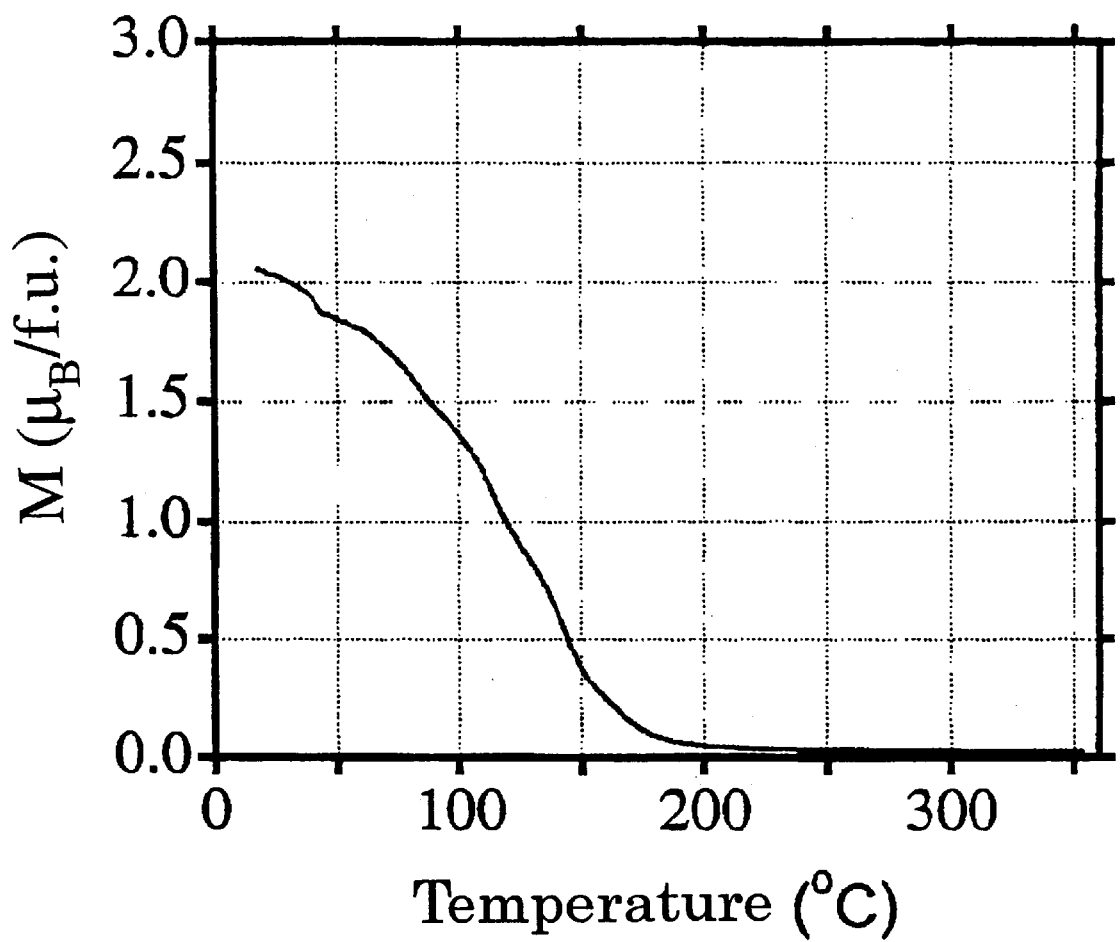
FIG. 5 is a graph illustrating temperature dependency of magnetization of $Sr_2FeMoO_6$ which is the polycrystalline ferromagnetic metal oxide of the present invention.

FIG. 5 shows the temperature dependency of the magnetization of $Sr_2FeMoO_6$ The result shows that the Curie temperature reached 158° C., which is greater than the conventional one (146° C. as described in Galasso's text). FIG. 5 indicates that $Sr_2FeMoO_6$ is a single phase material and remains as a ferromagnet under this temperature but loses the magnetization to be a paramagnet over this temperature. That is, the temperature is the Curie temperature.

Figure 6:
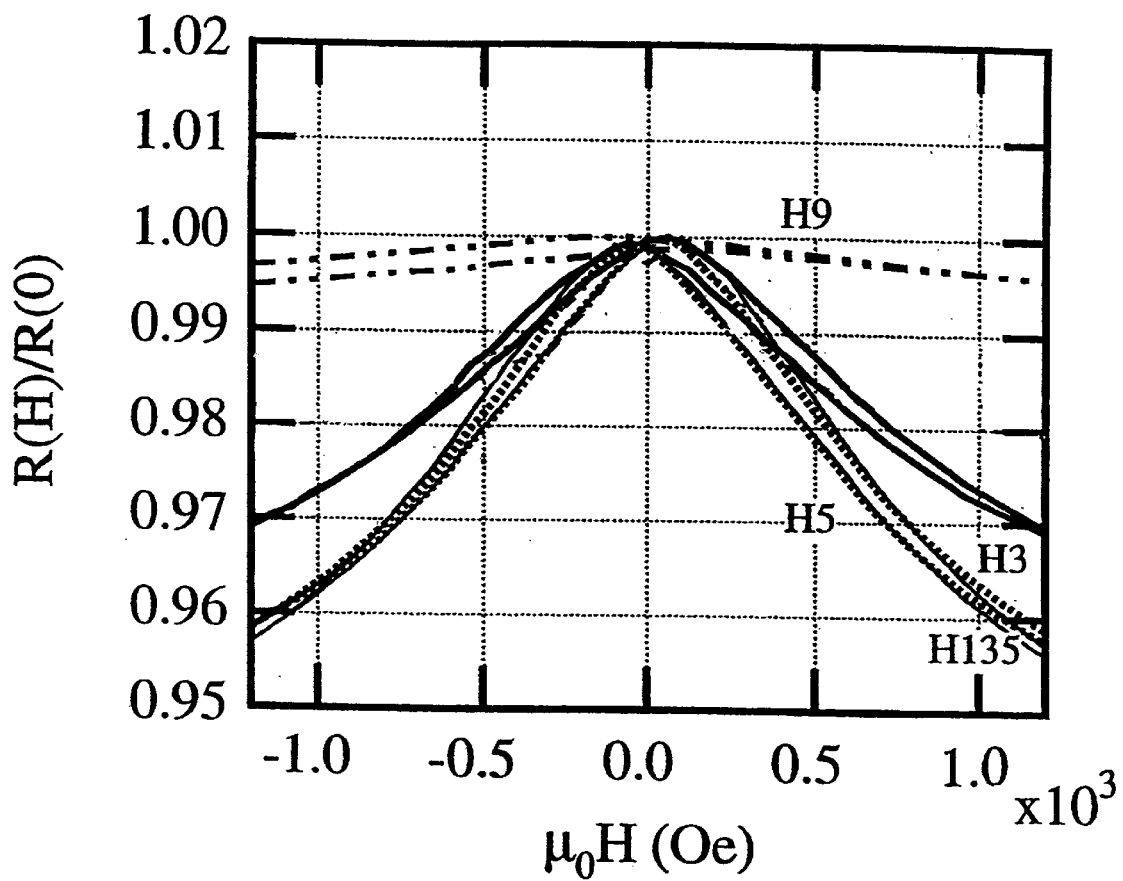
FIG. 6 is a graph illustrating magnetoresistance (magnetoresistance: (R(H)/R(0)) vs. magnetic field: $\mu_0 H$) of various $Sr_2FeMoO_6$ bulk samples.

FIG. 6 shows the magnetoresistance of a $Sr_2FeMoO_6$ bulk sample at room temperature. The measurement was performed by the 4-terminal method by applying the magnetic field orthogonally to the direction of current flow. Current used for the measurement was 20 mA (max. 20 mA). Two samples were used, one, which includes three lots having different amounts of $SrMoO_4$, is indicated by H3, H5, and H135 in which the deterioration is promoted and thus oxidized at the density of about 95% and a heterogeneous phase is contained, the other is indicated by H9 in which the density exceeds 99%. As a result of the measurement while varying the magnetic field from +0.12 T to −0.12 T, H9 did not show any change in the magnetoresistance, indicating that MR was very small. This indicates that the grain boundaries are not insulative and do not serve as the tunneling junction. In the prior art, about 3% of MR has been observed even in a low magnetic field as shown in FIG. 6. Also in our experiment, the resistivity was as high as 10 mΩ cm at the maximum and MR of about 3 to 5% was observed for $SrMoO_4$ containing the heterogeneous phase (H3, H5, and H135 in FIG. 6). In contrast, it has been reported that almost single crystal materials without grain boundaries such as thin films and single crystals exhibit small MR. This behavior is in correspondence with that of the high density bulk.

The samples of the present invention were subjected to transmission electron microscope observation. Neither heterogeneous phase nor amorphous phase was observed. The resistance was measured by the 4-terminal method and an average of the tested 5 samples was 0.48 mΩ·cm.

The materials of the present invention are manufactured in a reducing atmosphere rather than in air, so that stability in the atmosphere is worried about. Therefore, the materials were heated at room temperature, 100° C., 200° C. and 300° C. in an atmospheric air for 7 hours, and then the X-ray diffraction pattern and the resistivity were measured for comparison. As a result, both parameters did not vary even at 300° C., which indicates that the materials of the present invention can stand stable under heating at 300° C.

The polycrystalline material of the present invention was formed into a column of 20 mmφ×5 mmt to be used as a target for laser ablation to form a thin $Sr_2FeMoO_6$ film. Excimer laser (KrF:248nm) was introduced from a view port of a vacuum chamber to be applied on the surface of the target from an angle of 45°. A $SrTiO_3$ single crystal substrate was located 3 to 10 cm immediately above the target to form the thin film.

The vacuum chamber was vacuum-exhausted with a two-step turbo molecule pump and oxygen was introduced while maintaining the vacuum state to 1×10$^7$ Pa, and then the thin film was formed under oxygen pressure of 1×10$^5$ Pa at a substrate temperature of 950° C. for 30 minutes. Under the same conditions, a comparative thin film was formed using a target prepared without performing the high pressure treatment in the calcining step of the target.

Observation of the surfaces of both thin films with a scanning electron microscope shows that droplets on the surface of the thin film were reduced down to one percent or less of those of the comparative film. Even though the same film formation was repeated 30 times, the surface characteristics do not change, which indicates favorable thin films were obtained for every 30 formation steps. Further, in the case where the formation of another thin film was carried out using another target under oxygen atmosphere and about 100 mm Torr in the same vacuum chamber and then the formation of the thin film of the present invention was carried, out with the target of the present invention, the thin film of the present invention was obtained with the same quality. Since the target was highly densified, it was laser sputtered in a similar way as a single crystal target. Therefore the thin film was formed with good reproducibility, with less change in surface configuration and laser plume. Further, since the oxidization by the grain boundaries is less, deterioration caused by the oxidization is appeared to be reduced.

According to the present invention, a polycrystalline ferromagnetic metal oxide with small resistance, to which given a density of 97% or more to less than 100%, can realize resistivity as low as that of a single crystal. Since the polycrystalline ferromagnetic metal oxide is not denatured up to a temperature as high as 300° C. in an atmospheric air, resistance to deterioration in air can be dramatically improved, and therefore, can be provided a target suitable for laser ablation and high temperature sputtering which are very suitable techniques for the formation of a thin film of the polycrystalline ferromagnetic metal oxide.

Further, if crystal grains that constitute the polycrystalline ferromagnetic metal oxide have the grain boundaries coupled in an atomic level, the polycrystalline grain boundaries can lower thermal conductivity and maintains the resistance as low as that of the single crystal. Therefore, thermoelectric effect can be increased and the polycrystalline ferromagnetic metal oxide can be used as a thermoelectric device.

Still further, according to the manufacturing method of the present invention, the polycrystalline ferromagnetic metal oxide of high performance and low resistance as described above can be provided in bulk with small costs by means of a simple and convenient treatment for high densification under high pressure reducing gas. Therefore, for example, a tunneling magnetoresistance device of low resistance provided by combining a junction type and a granular type can be supplied with less costs, and further a high-capacity magnetic head and a ultra-high sensitive magnetic sensor can also be provided with less costs.

What is claimed is:

1. A polycrystalline ferromagnetic metal oxide which comprises strontium, iron, molybdenum and oxygen wherein the ferromagnetic metal oxide has a resistivity of not more than 1 mΩ cm and has a density in the range of 97% to 100%.

2. A polycrystalline ferromagnetic metal oxide according to claim 1, which is $Sr_2FeMoO_6$.

3. A polycrystalline ferromagnetic metal oxide according to claim 1, wherein grain boundaries between adjacent crystal grains comprising the polycrystalline ferromagnetic metal oxide are not insulators.

4. A polycrystalline ferromagnetic metal oxide according to claim 1, which has an ordered perovskite crystal structure which comprises an electro-conductive metal-oxygen octahedron.

5. A polycrystalline ferromagnetic metal oxide according to claim 4, which possesses a small electrical conductivity anisotropy.

6. A polycrystalline ferromagnetic metal oxide according to claim 1, whose crystal grains have grain boundaries coupled in an atomic level.

7. A polycrystalline ferromagnetic metal oxide according to claim 1, which has a resistivity of 0.3 to 0.4 mΩ cm.

8. A polycrystalline ferromagnetic metal oxide according to claim 1, which has a magnetoresistance of 2% or more.

9. A polycrystalline ferromagnetic metal oxide of claim 1 wherein the densified polycrystalline ferromagnetic metal oxide conducts electricity with about the same efficiency as a single crystal of the same ferromagnetic metal oxide composition.

10. A polycrystalline ferromagnetic metal oxide according to claim 1, which is obtained by treating a polycrystalline ferromagnetic metal oxide under a high pressure reducing gas for high densification.

11. A polycrystalline ferromagnetic metal oxide according to claim 10, in which the treatment is conducted in an atmosphere containing 1 to 5% of $H_2$ under a pressure of 300 to 600 kg/cm$^2$ at 1200 to 1300° C. for 1 to 10 hours.

12. A method of manufacturing a polycrystalline ferromagnetic metal oxide, which comprises strontium, iron, molybdenum and oxygen, the method comprising a step of treating a polycrystalline ferromagnetic material under a high pressure reducing gas for high densification in which the step is conducted in an atmosphere containing 1 to 5% of $H_2$ under a pressure of 300 to 600 kg/cm$^2$ at 1200° C. to 1300° C. for 1 to 10 hours.

* * * * *